United States Patent
Nolan (10) Patent No.: US 6,454,464 B1
(45) Date of Patent: Sep. 24, 2002

(54) FIBER OPTIC CONNECTORS AND TRANSCEIVER TEST DEVICES

(75) Inventor: Richard G. Nolan, Endwell, NY (US)

(73) Assignee: Computer Crafts, Inc., Hawthorne, NJ (US)

(*) Notice: Subject to any disclaimer, the term of this patent is extended or adjusted under 35 U.S.C. 154(b) by 0 days.

(21) Appl. No.: 09/938,143

(22) Filed: Aug. 23, 2001

Related U.S. Application Data (62) Division of application No. 09/473,370, filed on Dec. 28, 1999, now abandoned.
(60) Provisional application No. 60/134,669, filed on May 18, 1999, and provisional application No. 60/114,382, filed on Dec. 28, 1998.

(51) Int. Cl.[7] .............................. G02B 6/36; G02B 6/38
(52) U.S. Cl. .............................. 385/60; 385/72; 385/78
(58) Field of Search .............................. 385/52, 62, 70, 385/72, 78, 81, 82, 58, 60

(56) References Cited

U.S. PATENT DOCUMENTS

| | | | |
|---|---|---|---|
| 4,111,522 A | 9/1978 | Auracher et al. | 350/96.21 |
| 4,759,599 A | 7/1988 | Yamaguchi et al. | 350/96.21 |
| 4,818,059 A | 4/1989 | Kakii et al. | 350/96.21 |
| 4,830,456 A | 5/1989 | Kakii et al. | 350/96.2 |
| 4,950,048 A | 8/1990 | Kakii et al. | 350/96.2 |
| 4,978,193 A | 12/1990 | Tomita | 350/96.21 |
| 4,979,793 A | 12/1990 | Bowen et al. | 385/149 |
| 5,076,688 A | 12/1991 | Bowen et al. | 356/73.1 |
| 5,096,276 A | 3/1992 | Gerace et al. | 385/76 |
| 5,157,749 A | 10/1992 | Briggs et al. | 385/60 |
| 5,185,846 A | 2/1993 | Basavanhally et al. | 385/137 |
| 5,193,133 A | 3/1993 | Schofield et al. | |
| 5,214,730 A | 5/1993 | Nagasawa et al. | |
| 5,230,032 A | 7/1993 | Muzslay | 385/66 |
| 5,253,316 A | 10/1993 | Shibutani et al. | |
| 5,259,050 A | 11/1993 | Yamakawa et al. | 385/59 |
| 5,337,385 A | 8/1994 | Baderschneider et al. | 385/59 |
| 5,339,376 A | 8/1994 | Kakii et al. | 385/71 |
| 5,363,460 A | 11/1994 | Marazzi | 385/70 |
| 5,390,267 A | 2/1995 | Yanagawa et al. | |
| 5,404,416 A | 4/1995 | Iwano et al. | 385/60 |
| 5,422,971 A | 6/1995 | Honjo et al. | 385/80 |
| 5,475,781 A | 12/1995 | Chang et al. | 385/76 |
| 5,481,634 A | 1/1996 | Anderson et al. | 385/76 |
| 5,555,332 A | 9/1996 | Dean et al. | 385/53 |
| 5,566,262 A | 10/1996 | Yamane et al. | 385/33 |

(List continued on next page.)

FOREIGN PATENT DOCUMENTS

| | | | | |
|---|---|---|---|---|
| JP | 59-049510 | 3/1984 | | |
| JP | 2000-338367 A | * 12/2000 | ............ | G02B/6/38 |

Primary Examiner—Hemang Sanghavi
Assistant Examiner—Omar Rojas
(74) Attorney, Agent, or Firm—Lerner, David, Littenberg, Krumholz & Mentlik, LLP (57) ABSTRACT

A fiber optic connector in such as a male MT-RJ connector has a ferrule fixed to the housing. Ferrule-to-ferrule alignment is provided by the floating ferrule in the mating female MT-RJ connector. A field-installable connector includes a field termination unit with fiber stubs and index matching gel for receiving the cut ends of optical fibers. The fiber stubs extend into the ferrule of the connector. A loopback test unit includes a ferrule and housing like those of a standard connector. A fiber loop has both ends lodged in the fiber bores of the ferrule so that the loop will connect the transmitter of a transceiver to the receiver of the same transceiver when the unit is engaged in the connector of the transceiver. The fiber loop is held within a boot attached to the housing or ferrule so that the entire unit can be conveniently installed and removed, and so that numerous loopback testers can be used simultaneously even when the device under test has numerous closely-spaced transceivers.

11 Claims, 9 Drawing Sheets

U.S. PATENT DOCUMENTS

| | | | |
|---|---|---|---|
| 5,611,010 A | 3/1997 | Shiino et al. | 385/53 |
| 5,619,604 A | 4/1997 | Shiflett et al. | 385/59 |
| 5,631,985 A | 5/1997 | Yamada et al. | 385/59 |
| 5,638,474 A | 6/1997 | Lampert et al. | 385/78 |
| 5,689,598 A | 11/1997 | Dean, Jr. et al. | 385/59 |
| 5,712,939 A | 1/1998 | Shahid | 385/78 |
| 5,724,466 A | 3/1998 | Rickenbach et al. | 385/60 |
| 5,727,102 A | 3/1998 | Jeong et al. | 385/59 |
| 5,737,463 A | 4/1998 | Weiss et al. | 385/59 |
| 5,764,834 A | 6/1998 | Hultermans | 385/60 |
| 5,778,122 A | 7/1998 | Giebel et al. | 385/55 |
| 5,778,125 A | 7/1998 | Busse et al. | 385/80 |
| 5,799,122 A | 8/1998 | Jeong et al. | 385/59 |
| 5,809,191 A | 9/1998 | Stevens et al. | 385/59 |
| 5,809,192 A | 9/1998 | Manning et al. | 385/78 |
| 5,815,621 A | 9/1998 | Sakai et al. | 385/80 |
| 5,845,036 A | 12/1998 | De Marchi | 385/139 |
| 5,862,281 A | 1/1999 | Shahid | 385/78 |
| 5,862,282 A | 1/1999 | Matsura et al. | 385/86 |
| 5,867,621 A | 2/1999 | Luther et al. | 385/59 |
| 5,883,995 A | 3/1999 | Lu | 385/60 |
| 5,887,098 A | 3/1999 | Ernst et al. | 385/55 |
| 5,926,596 A * | 7/1999 | Edwards et al. | 385/78 |
| 6,019,521 A * | 2/2000 | Manning et al. | 385/77 |
| 6,200,040 B1 * | 3/2001 | Edwards et al. | 385/78 |

* cited by examiner

FIBER OPTIC CONNECTORS AND TRANSCEIVER TEST DEVICES

CROSS REFERENCE TO RELATED APPLICATIONS

This application is a divisional of U.S. patent application Ser. No. 09/473,370, now abandoned, filed on Dec. 28, 1999, entitled FIBER OPTIC CONNECTORS AND TRANSCEIVER TEST DEVICES, which application claims the benefit of U.S. Provisional Patent Application Ser. No. 60/134,669, filed on May 18, 1999, entitled FIBER OPTIC CONNECTORS AND TRANSCEIVER TEST DEVICES, and also claims the benefit of U.S. Provisional Patent Application Ser. No. 60/114,382 filed on Dec. 28, 1998, entitled FIBER OPTIC CONNECTORS. The disclosures of the three aforementioned applications are incorporated by reference herein. The present divisional application is also related to the co-pending, commonly assigned United States Patent Application of Richard G. Nolan entitled FIBER OPTIC CONNECTORS, U.S. patent application Ser. No. 09/473,372, filed Dec. 28, 1999, the disclosure of which is hereby incorporated by reference herein.

FIELD OF INVENTION

The present invention relates to the field of fiber optics and more specifically relates to improvements in connector components and methods for use in making connections in fiber optic systems, to loopback devices for use in testing optical devices, and to methods of using such devices.

BACKGROUND OF THE INVENTION

Fiber optic communication systems send messages in the form of pulses of light along thin strands of transparent material, referred to as optical fibers. One common application for such systems is in carrying digital data between computers in a network or between portions of a large computer. In a typical system, a device referred to as an optical transmitter includes a laser that emits light. The intensity of the light is varied in accordance with the information to be sent. The emitted light is focused on an end of an optical fiber so that the light is transmitted along the fiber. At the other end of the fiber, the light is directed onto a photodetector, which transforms the light into an electrical signal. The electrical signal also varies in accordance with the information being sent. A "duplex" system typically uses two fibers in parallel, and has a transmitter and a receiver at each end of the system so that information can be sent in opposite directions along the two fibers. The transmitter and receiver at each end typically are combined in a single device referred to as a "transceiver". Optical communication systems can transmit data at rates many times faster than systems using electrical wires, and offer other advantages.

Typically, the optical fibers are provided in optical cables. The fibers themselves are covered by protective coatings or "sheathing". The cable includes one or more individual sheathed fiber optics, covered by an external jacket and may also include components for protecting the cable against physical strain. To set up an optical communications system, cables of this type are connected to optical devices such as transceivers and to one another in much the same way as electrical cables are connected to electronic devices and to one another to set up an electronic system. However, connecting an optical cable requires that the individual optical fibers be precisely aligned with the mating fibers or devices. The optical fibers commonly are as small as 0.125 mm (0.005 inches) in diameter. To connect two fibers end-to-end, the mating ends should be aligned with one another within a few microns, i.e., within hundred-thousandths of an inch, and should be butted against one another with essentially no gaps. Even slight deviation from these tolerances can cause appreciable loss of light transmitted along the fibers and degradation of the signal. Likewise, when an optical cable is connected to a transceiver or other device, the fibers must be precisely positioned relative to the optical elements of the device. Optical cables are provided with devices referred to as "connectors" which can be engaged with mating connectors on other cables, or with mating features on transceivers or other devices, to align the fibers with the required precision.

One type of connector that has been proposed is referred to in the industry as an MT-RJ connector. U.S. Pat. No. 5,926,596 depicts a typical MT-RJ connector. Reference is made to the '596 patent without admission as to whether or not such patent constitutes prior art against the present invention. As shown in the '596 patent, a typical MT-RJ connector includes an exterior housing which resembles the exterior housing of the common "RJ" plug used to connect a home telephone to a wall outlet. The housing has a flexible catch on its exterior. A "ferrule" is movably mounted within the housing at a forward end of the housing, so that a forward face of the ferrule is exposed to the exterior of the housing. A spring inside the housing urges the ferrule in the forward direction. The ferrule has a pair of fiber bores for receiving two individual fibers of the cable, and a pair of pin holes for receiving alignment pins. A "male" MT-RJ connector has alignment pins permanently disposed in its alignment pin holes, whereas a "female" MT-RJ connector has empty pin holes. The connectors may be permanently installed on the ends of fiber optic cables by the cable manufacturer. The cable manufacturer positions the fibers in the fiber bores and polishes the ends of the fiber precisely flush with the front of the ferrule.

To connect two cables end-to-end, male and female connectors are inserted into opposite ends of a hollow double-ended socket so that the catches on their housing engage with the socket and the socket physically holds the housings in crude alignment with one another. The pins on the ferrule of the male connector engage the pin holes in the ferrule of the female connector, and hold the ferrules, and hence the fibers, in precise alignment with one another. The springs in the housings urge the ferrules forwardly so that the front faces of the ferrules, and hence the ends of the fibers, abut one another. Devices such as transceivers are equipped with single-ended sockets adapted to receive the housing of a connector. Such sockets are equipped with pins corresponding to the pins of a male MT-RJ connector for engaging the ferrule of a female connector so as to hold the ferrule and hence the fibers of the cable in precise alignment with the device.

Despite considerable effort devoted by the art to development of fiber optic connectors, sockets and related components, there are still needs for further improvements.

There exists a need for further improvement to create more economical connectors. Anything which can be done to eliminate parts and assembly expense in the connector and in the process for attaching the connector to the cable at the factory would be desirable.

It would be desirable to provide a field-installable connector which can be attached to a raw, newly cut cable end by a technician in the field. Such a connector should be compatible with the factory-prepared connectors and with the sockets used for such connectors. Moreover, such a field-installable connector should fit within the space available for installation according to industry standards. Such a connector should be relatively easy for the technician to install and should provide a good optical connection.

There are also needs for improvement in loopback testing of optical transceivers. As well known in the art, many optoelectronic components such as network hubs and interfacing devices incorporate numerous optical transceivers. Each transceiver has a transmitter arranged to send optical signals and a receiver arranged to receive the optical signals and convert the same back to electronic signals.

The transceivers commonly are tested by a "loopback" test. In a loopback test, a single fiber is connected to the transmitter and receiver of a single transceiver so that light sent by the transmitter is received by the receiver. If the transceiver can send signals to itself this manner, then both the transmitter and receiver incorporated in the transceiver are operational. Such a test can be conducted by connecting both ends of a single fiber to a standard MTRJ connector to form a local loop and inserting that connector into the socket associated with a transceiver. Several problems are encountered using this approach. The optical power appearing at the receiver may be too great for the receiver to handle. Typically, the transmitter is designed to send an optical signal strong enough to propagate over tens, hundreds or thousands of meters of fiber, whereas the fiber in a local loop may be a meter or less in length. Thus, the signal reaching the receiver from the transmitter over the local loop is far stronger than the receiver can accommodate. Also, where numerous transceivers incorporated in a single assembly are to be tested, connectors with such local loops must be inserted into sockets associated with all of these transceivers. All of these loops form a tangle of fibers overlying the surface of the assembly and making it difficult for the technician to work with the device. Moreover, the local loops, with their associated connectors, are relatively costly.

SUMMARY OF THE INVENTION

The present invention addresses these needs and provides improvements that can be used in MT-RJ connectors, couplers and loopback systems. The improvements are described below.

In one aspect of the present invention, a male MT-RJ connector includes a housing adapted to fit within an MT-RJ socket, a ferrule mounted in the housing in substantially fixed position, the ferrule having a front face and having fiber bores extending to said front face, and alignment pins projecting from the ferrule. Such a connector is similar to a normal MT-RJ connector, but has its ferrule fixed to the housing rather than movable with respect to the housing. This aspect of the present invention incorporates the realization that because male MT-RJ connectors are not normally connected with devices such as transceivers but instead are mated only with female MT-RJ connectors which include movable ferrules, and the further realization that movability of the ferrule with respect to the housing in one of the two mating elements is sufficient to permit alignment of the mating ferrules. Thus the elements needed to make the ferrule movable can be omitted in the male connector while still providing a usable male connector.

Indeed, the preferred connectors according to this aspect of the invention can provide results superior to those achieved with more expensive male connectors having floating ferrules. When two connectors are mated with one another in a coupler, the pins of the ferrule of the male connector may initially be misaligned with the pin-receiving holes in the ferrule of the female connector. If this initial misalignment is within the design limit, typically less than one-half the diameter of a pin, the pins will find the holes and guide the ferrules into precise alignment with one another. However, if the initial misalignment is greater than this limit, the pins will not enter the holes and the connection cannot be made. This condition is referred to in the art as "stubbing". There is some initial misalignment due to tolerances on the coupler and the connector housings. Where both connectors are made with "floating" ferrules, movable relative to their respective connector housings, the float may contribute additional initial misalignment, up to two times the amount of float or movability provided in each connector. This can occur if both ferrules are displaced in opposite lateral or vertical directions relative to their connector housings. However, where only one connector can float, the additional initial misalignment due to float is at most one times the amount of float in one connector. Thus, the male connectors according to this aspect of the invention, with fixed ferrules, reduce the possibility of stubbing and provide greater reliability.

A connector with a fixed ferrule a connector may be made as a field-installable connector. In this case, the connector further comprises a field termination unit having fiber bores therein, and pre-installed fiber segments extending from the field termination unit fiber bores and extending in the fiber bores of the ferrule to the front face of the ferrule. The field termination unit may be disposed in the housing immediately behind the ferrule. The connector further comprises a fitting retaining the field termination unit in the housing. The fitting may be a crimp nut having a rear portion defining a channel adapted to pass the fibers of a fiber optic cable. The rear portion of such a crimp nut is adapted to fit within the jacket and reinforcement of the cable so that the cable can be secured to the crimp nut by a crimp ring encircling the jacket.

More generally, a fixed-ferrule connector may include a device disposed in the housing and engaging the rear surface of the ferrule to maintain the ferrule in position within the housing. The pins have heads projecting from the rear of the ferrule. The device may engage the pins and may retain the pins against forward and rearward motion relative to the ferrule and housing.

A further aspect of the present invention provides a device for use in making a male MT-RJ connector. The device has a body adapted to fit within the housing of an MT-RJ connector. The body defines a forward wall adapted to engage the rear surface of a ferrule and a pair of pin head slots disposed rearwardly of the forward wall. The pin head slots are open to a top surface of the device so that a ferrule with pins therein can be advanced downwardly relative to the device to engage the heads of the pins in the pin head slots. Preferably, the body defines a generally U-shaped fiber channel open to the top of the device at the rear of the device.

In a related aspect of the present invention, a method of making a male MT-RJ connector comprises the following steps: (a) assembling the fibers of a fiber optic cable into fiber bores of a ferrule, securing the fibers to the ferrule and polishing the front face of the ferrule and the forward ends of the fibers; (b) assembling pins into the ferrule so that heads on the pins project rearwardly from the ferrule, and so that the pins project forwardly from the front face of the ferrule; (c) advancing the ferrule and fibers downwardly into a device so as to engage the heads of the pins in pin head grooves of the device and place the fibers into the device so that the fibers extend from the rear of the device and thereby form a subassembly; and (d) placing the subassembly formed in step (c) into a housing so that the device is engaged in the housing and abuts the rear surface of the ferrule to hold the ferrule in position in the housing.

Preferably, the method further comprises the step of securing the jacket of the cable, a reinforcement of the cable or both to the rear end of the device. The step of placing the subassembly into the housing includes advancing the subassembly forwardly to engage features of the device and housing and thereby lock the device to the housing.

A further aspect of the present invention provides a loopback test unit for an optical transceiver. The transceiver has input and output fibers and a connector adapted to mate with a fiber optic connector on a fiber optic cable so that the input and output ports of the transceiver are in optical communication with fibers of the cable. The loopback test unit includes a housing having exterior configuration corresponding to the configuration of a fiber optic connector housing on a fiber optic cable. The unit further includes an optical fiber. The fiber has two ends positioned relative to the housing so that both ends of the fiber will be disposed in optical communication with the input and output ports of the transceiver to place the output port of the transceiver in communication with the input port of the transceiver when the housing is mated with the connector of the transceiver. The test unit most preferably further includes a boot secured to the housing enclosing the fiber.

Preferably, the fiber is unsheathed, bent, or both. Additionally, it is preferred that the bent fiber is in the form of one or more generally circular loops enclosed within the boot. The loopback test unit according to this aspect of the invention thus provides a self-contained device which can be plugged into a connector on an optoelectronic component and used to test the component. Units of this type are useful in test of any device with a transceiver, but are especially valuable in use with devices such as a network hubs and interfacing devices incorporating numerous optical transceivers. Loopback test units according to this aspect of the invention eliminate the tangle of overlapping loops encountered with conventional test methods.

The optical fiber may be formed from a polymer or glass. Preferably, the optical fiber has a diameter larger than the nominal fiber diameter of the transceiver. That is, the fiber has a larger diameter than the fiber normally used with the transceiver, and hence the tolerances required in aligning the loopback test unit fibers with the transceiver are considerably looser than those required for alignment of a nominal fiber with the transceiver. As further explained below, such a fiber tends to attenuate the signal. This aspect of the present invention incorporates the realization that such attenuation, while undesirable in a normal communication fiber, is actually desirable in a loopback test unit fiber to prevent overloading the receiver.

The connector of the transceiver typically is adapted to engage and disengage the connector by mating and demating motion of the connector in forward and rearward directions. The boot and housing desirably have dimensions transverse to the forward and rearward directions approximately equal to the corresponding dimensions of a fiber optic connector or smaller. Where the transceiver is arranged to mate with and MT-RJ connector, the boot has vertical dimensions of about 11-mm or less and lateral dimensions about 10.5-mm or less. Preferably, the boot is mounted in fixed position relative to the housing.

The test unit typically comprises a ferrule mounted on the housing of the test unit. The optical fiber has ends mounted to the ferrule and exposed at a front face of the ferrule. Preferably, the ferrule is formed by molding a polymeric composition. Such a molded ferrule can meet the relatively loose tolerances on fiber alignment associated with the loopback test unit. The use of such a molded ferrule considerably reduces the cost of the test unit.

According to a related aspect of the invention, an optical communication device includes a plurality of optical transceivers and a plurality of connectors optically coupled to the transceivers. The connectors are disposed side by side in an array, and a plurality of test units as described above are releasably connected to the connectors for testing the transceivers.

A further related aspect of the invention provides a method of testing a plurality of transceivers in an optical communications device comprising the following steps: providing a plurality of optical test units as described above; temporarily engaged with an array of connectors associated with the transceivers; testing the transceivers by sending signals through the test units and then removing the test units. Preferably, the step of providing a plurality of test units is performed by installing the test units at a manufacturing location, and shipping the transceivers, connectors and test units together to a usage location. The step of testing the transceivers is performed at the usage location. Desirably, the loopback test units are so economical that they may be discarded after the test is complete.

These and other objects, features and advantages of the present invention will be more readily apparent from the detailed description of the invention set forth below, taken in conjunction with the accompanying drawings.

DETAILED DESCRIPTION OF THE PREFERRED EMBODIMENT

Figure 1:
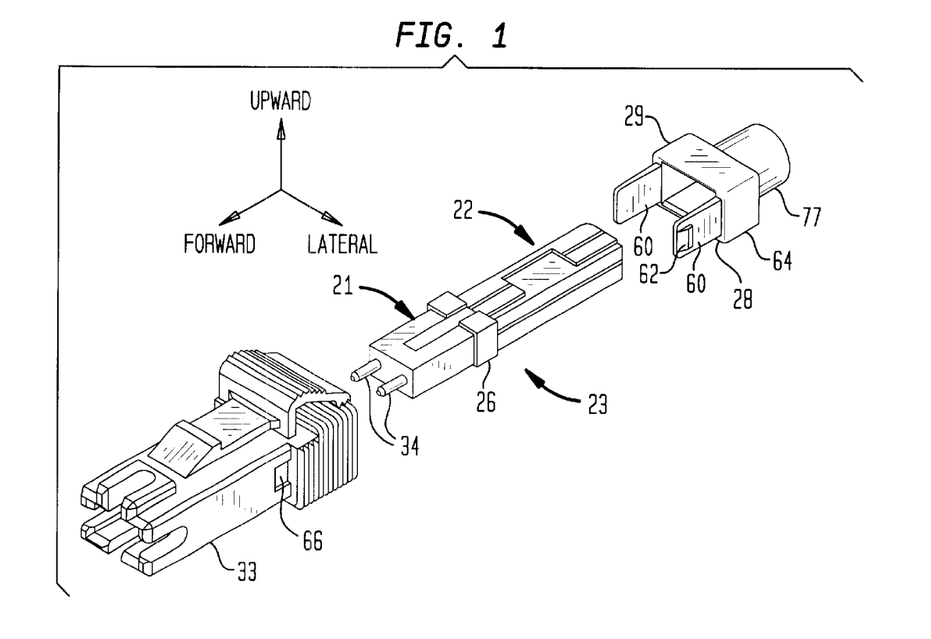
FIG. 1 is an exploded view of a field terminated connector according to one embodiment of the present invention.
Figure 2:
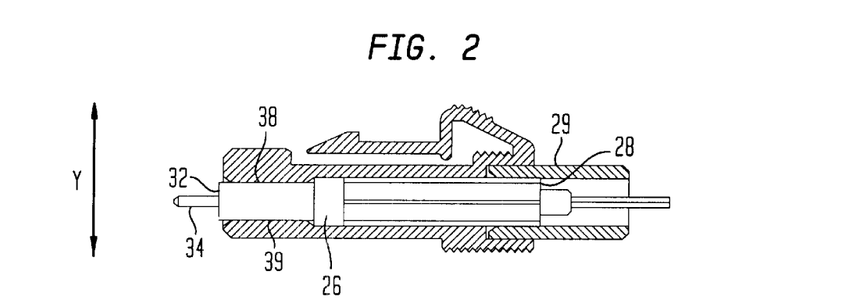
FIG. 2 is a side cross-sectional view of the connector of FIG. 1.
Figure 3:
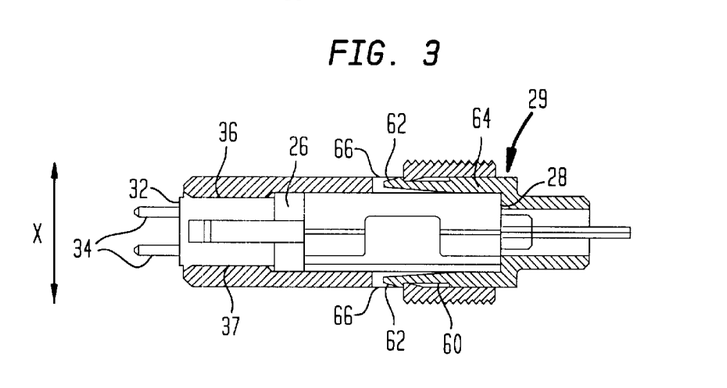
FIG. 3 is a top cross-sectional view of the connector of FIG. 1.
Figure 4:
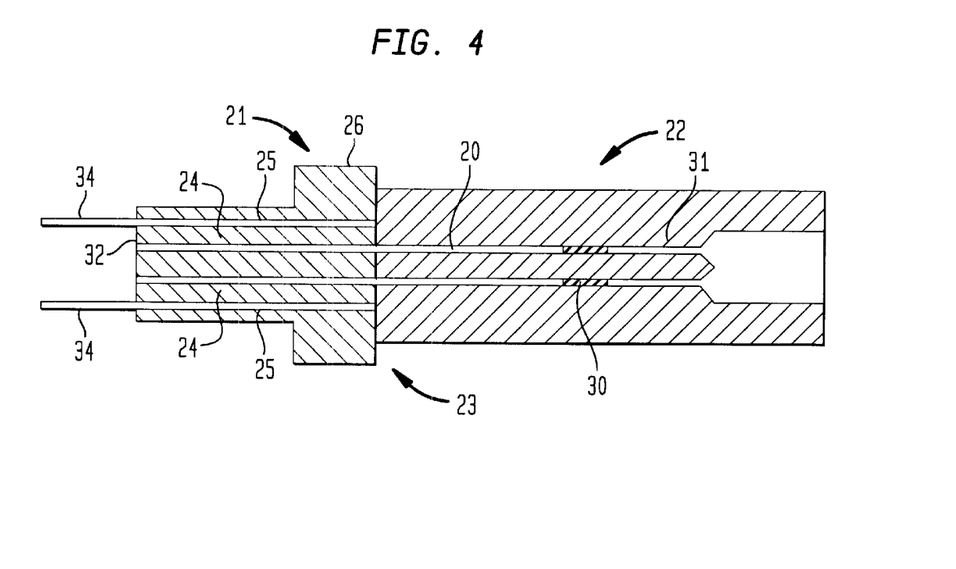
FIG. 4 is top cross-sectional view on an enlarged-scale of certain components used in the connector of FIG. 1.

A field termination connector according to one aspect of the invention is depicted in FIGS. 1–4. This connector is compatible with MT-RJ connectors as taught, for example, in the '382 provisional application. Certain features of the connector are explained below with reference to directions such as "upwardly", "forwardly", "rearwardly" and "laterally". These directions are orthogonal to one and other as illustrated in FIG. 1. As shown in FIG. 1, the "forward" direction is the direction in which the connector is advanced when the connector is inserted into the socket. These directions are given in the frame of reference of the connector itself, and need not bear any relation to the gravitational frame of reference. This connector uses a field terminated ferrule assembly 23 of the type which is commercially available from the Fujikura Company of Tokyo, Japan. A field terminated ferrule includes a conventional ferrule, such as an MT type ferrule 21 having fiber bores 24, pin bores 25 and an enhanced head 26 in conjunction with a field termination unit 22. The field termination unit includes a pair of pre-installed fiber segments 20 disposed in bores 31 within the termination unit. These pre-installed fiber segments extend into the fiber bores 24 of ferrule 21, and extend to the front face 32 of the ferrule. A refractive index matching compound such as a gel 30 is disposed in the fiber bores of the field termination unit. In use, the fibers of a cable to be connected are cut and the cut ends are inserted into the fiber bores of the termination unit, so that the fibers of the cable are in optical communication with the pre-installed fiber segments.

The ferrule 21 of the field terminated ferrule assembly has pre-installed alignment pins 34 projecting from the front face 32. The housing 33 and crimp nut 29 are designed to affix the field terminated ferrule assembly 23, with alignment pins 34, in a centralized, fixed position relative to housing 33 with the front face 32 of the ferrule disposed on the optical plane 35 at the front end of the housing.

The housing 33 is designed to centrally locate the ferrule in the x-y direction by way of inside alignment surfaces 36, 37, 38, 39 that locate close to the ferrule with little clearance or with a slight interference fit. The inside surfaces may be flat or else may have ribs (not shown) for engaging the exterior surfaces of the ferrule.

The crimp nut 29 comprises a housing 64, having a pair of projections 60 extending forwardly from the housing. Projections 60 have snaps 62 extending laterally outward from the projections. A hollow boss 27 extends rearwardly from housing 29. The snaps 62 of crimp nut 29 engage in holes 66 in the connector housing 33. The crimp nut holds the ferrule 21 from moving away from the optical plane 35 by means of a shoulder 28 that holds the back of the field terminated ferrule assembly 23 in place. In this condition, the head 26 of the ferrule bears against studs at the rear of alignment surfaces 36–39. Thus, the ferrule 21 is fixed in position relative to the housing 33. When an optical cable is assembled into the connector, the jacket and reinforcing fiber layer of a fiber optic cable are placed around the outside of the rear boss 27 on the crimp nut, and held in place by a crimp ring (not shown) overlying the outside of the jacket and the rear boss.

This arrangement of a fixed ferrule with pins projecting from the front face of the ferrule emulates the interface found in transceiver modules having fixed optical interfaces with alignment pins. The ferrule of a male connector (with pins) need not have the ability to float relative to the housing, because the mating female connector (having a ferrule with empty guide pin holes adapted to receive the guide pins of the male connector) always has the ability to float relative to its housing. This allows the ferrules of the mating connectors to be precisely aligned with one another despite misalignment of the housings.

Advantages are realized in: having a design almost identical to a normal MT-RJ connector such as that shown in the '382 application, eliminating the cost of a spring, simplifying the assembly of the connector, and having a connector with only slightly increased forwarded to rearward length, despite the presence of field termination unit 22. This relatively compact overall size is achievable in part because of the elimination of the spring commonly used in an MT-RJ connector. In particular, the connector housing 33 has an external shape with a forward end identical to a normal MT-RJ connector. Thus, both types of connectors may be engaged interchangeably in sockets of couplers such as a double-ended socket as described in greater detail in the co-pending applications incorporated by reference herein. Such a double-ended socket will receive an MT-RJ connector in each end and engage the connectors with one another. A field installed male connector as illustrated in FIGS. 1–4 can be inserted in one end of a double-ended socket, whereas a standard MT-RJ female connector is inserted in the opposite end. Housing 33 may have slightly different interior dimensions than a standard MT-RJ housing, and may be slightly longer in the forward-to rearward direction than the normal MT-RJ housing to provide enough space for the field-terminated ferrule assembly.

Moreover, the lateral and vertical dimensions of the field termination connector may be identical to the corresponding dimensions of a standard MT-RJ connector. This assures that the filed termination connector can be used even if multiple sockets and connectors are disposed side-by-side at close spacing on a panel board.

Figure 5:
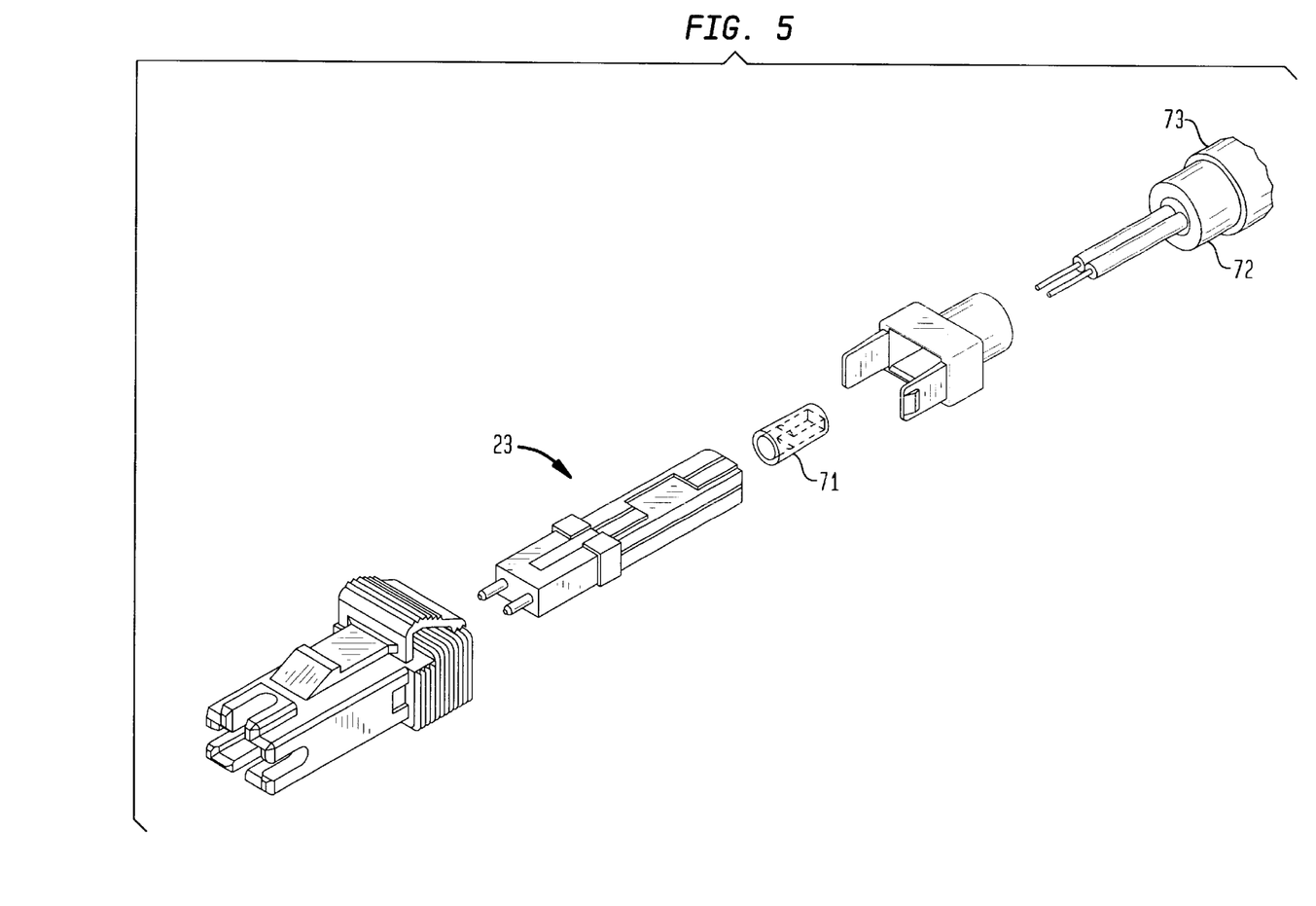
FIG. 5 is an exploded view of a field termination connector according to a further embodiment of the present invention.
Figure 6:
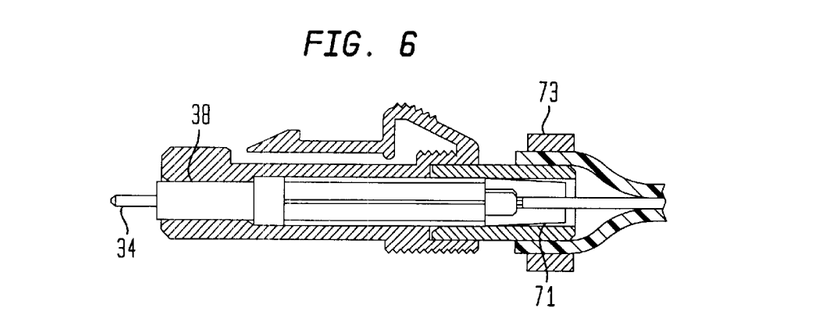
FIG. 6 is a side cross-sectional view of the connector in FIG. 5.
Figure 7:
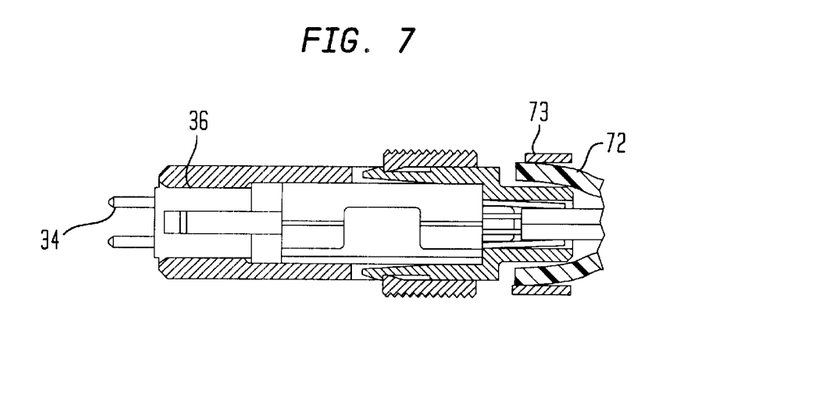
FIG. 7 is a top cross-sectional view of the connector in FIG. 5.

As shown in FIGS. 5–7, a variant of the structure illustrated in FIGS. 1–4 incorporates a strain relief 71 surrounding the jackets of the fibers and engaged in the crimp nut 29. In a further variant, the strain relief may be secured to the crimp nut, to the jackets of the fibers, or both by an epoxy or other adhesive to enhance the axial pull strength of the jacketed fibers. In a further variant, the jacketed fibers may be secured directly to the crimp nut by the adhesive, with or without a separate strain relief. The same approaches can be used for ribbon-type fiber optic cables. In the embodiments of FIGS. 1–4, and in the embodiment of FIGS. 5–7, the outer jacket of the cable (not shown) typically overlies the outside of the crimp nut and is held on the crimp nut by a metal crimp ring.

A connector according to a further embodiment of the invention, illustrated in FIGS. 8–11 typically is factory-installed on the cable. This connector does not include a field termination unit as discussed above with reference to FIGS. 1–4. Instead, the connector of FIGS. 8–11 includes a device 41 which provides a cost effective and time saving method for the assembly of the connectors. Device 41 has an open top surface defining a generally U-shaped fiber channel 51 extending forwardly and rearwardly at the back end of the device. The device also has a set of front partial walls 53 projecting laterally inwardly from opposite sides of the device adjacent the front of the device and a set of rear partial walls 52 projecting laterally inwardly from opposite sides at locations spaced rearwardly from the front partial walls so as to define a pair of pin head grooves 54 open to the top of the device between the front and rear partial walls. The device also has a pair of latches 55 projecting from laterally opposite sides.

Figure 8:
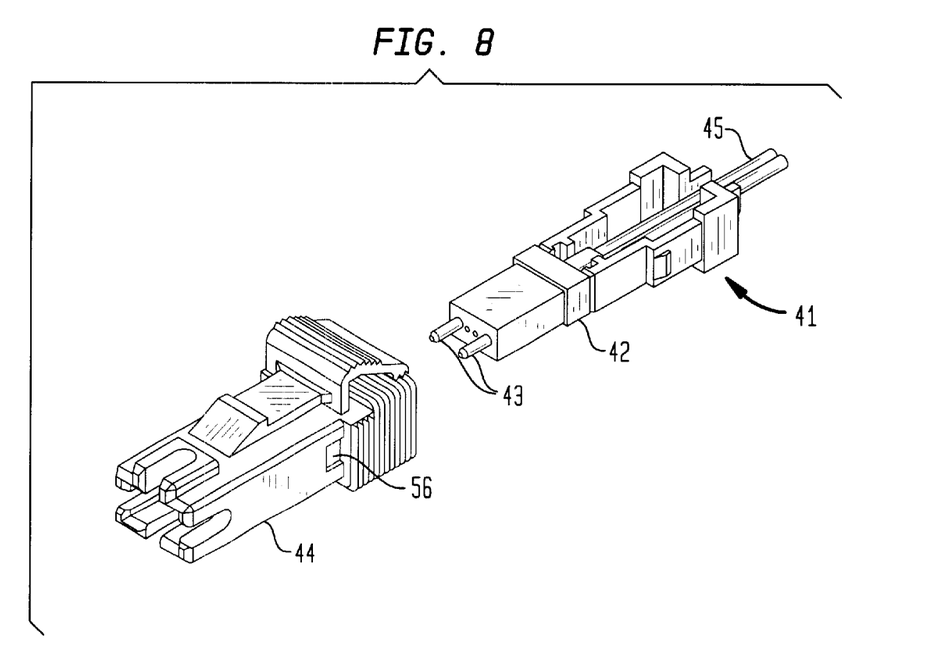
FIG. 8 is an exploded view of an MT-RJ connector with a fixed ferrule as provided in the present invention.
Figure 9:
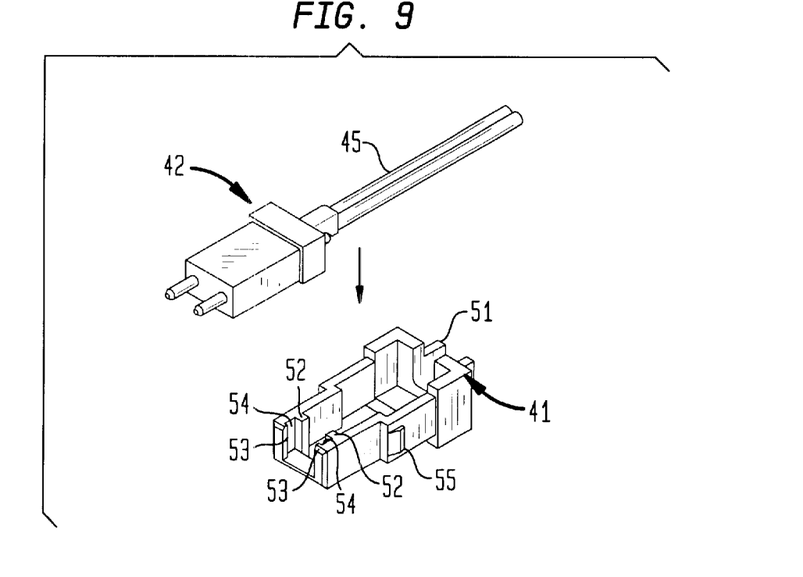
FIG. 9 is an exploded view of certain components used in the connector of FIG. 8.
Figure 10:
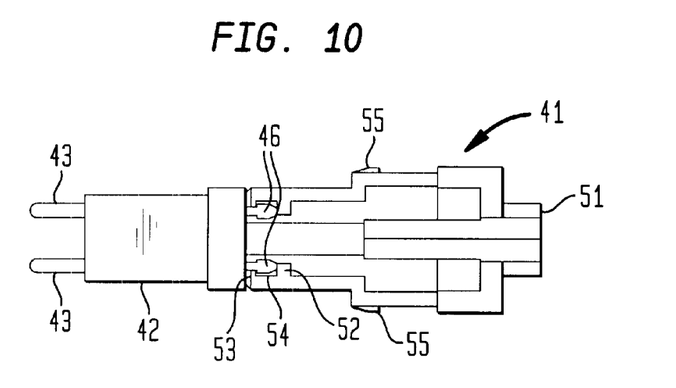
FIG. 10 is a top plan view of the components shown in FIG. 9.
Figure 11:
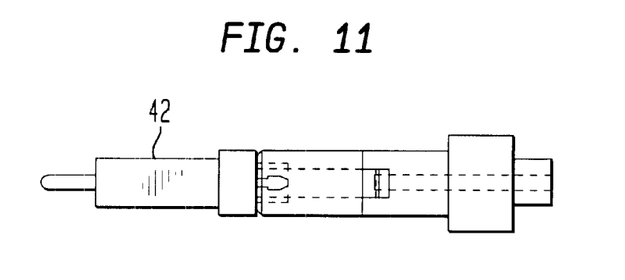
FIG. 11 is a side elevational view of the components shown in FIG. 9.

Device 41 is assembled together with a standard MT-RJ ferrule 42, alignment pins 43 and a field terminating style housing 44 which may be identical to housing 33 discussed above. As best seen in FIG. 8, the fibers 45 may be assembled to the ferrule, using an epoxy and ferrule boot as taught in the '382 application. The front face of the ferrule and the fiber ends are polished in the conventional manner, and alignment pins 43 are inserted in the alignment pin bores of the ferrule. The ferrule fibers and alignment pins are then advanced downwardly into device 41. Device 41 is located behind the ferrule. The pin head grooves 54 of the device capture the heads 46 of the alignment pins for the purpose of preventing their movement. The device and ferrule are advanced forwardly into housing 44, so that the device snaps into the housing, with latches 55 engaged in holes 56 in the housing. The device, and the walls of the housing which surround ferrule 42, hold the ferrule in a fixed position with the front face of the ferrule disposed at a centralized position on the optical plane at the front end of the housing. The jacket and reinforcing fibers of the cable can be advanced over the U-shaped channel 51 at the back end of device and secured in place by a crimp ring around the outside of the jacket.

The device eliminates the need to manage connector components on the fiber cable during the ferrule assembly process, thus simplifying the procedure, and eliminates the need for a spring and separate pin retainer, thus reducing cost. This aspect of the invention incorporates the realization that a floating ferrule, and the more complex assembly procedures required to provide a floating ferrule, are not necessary in the case of a male connector having alignment pins.

Other ways of mounting the ferrule at a substantially fixed position in the housing can be used. For example, the ferrule can be mounted to the housing by an adhesive, which may be the same as or different from the adhesive used to secure the fibers in the ferrule.

Figure 12:
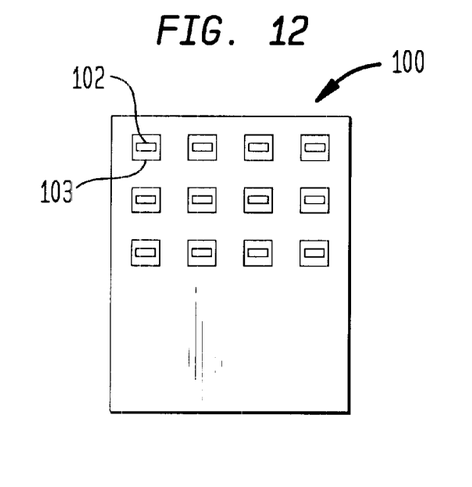
FIG. 12 is a diagrammatic elevational view of an optoelectronic component.

A further aspect of the present invention provides a loopback test unit for optical transceivers. As shown in FIG. 12, a typical optical component 100 such as a network hub or switching device includes transceivers having optical output and input ports in sockets 103. For example, the transceivers may be provided with male components 102 similar to ferrules mounted in sockets 103. These components have projecting guide pins like the guide pins of a male MT-RJ ferrule, but do not have fibers disposed therein. The front face of each such component defines a plane commonly referred to as the "optical plane". The optical transmitter of each transceiver includes a light source such as a laser diode and optical elements arranged to focus the light from the source onto a spot at a precisely defined location at the optical plane, so that such light will be directed into a fiber of a mating cable terminating at such spot in the optical plane. Similarly, the receiving component such as a photodiode is arranged to accept light emanating from the end of a fiber disposed at a spot in the optical plane. A cable terminated by a female MT-RJ connector as described, for example, in the '382 application and having its fiber ends held in the ferrule of such female MT-RJ connector can be coupled to the input and output ports of the transceiver by engaging the connector in the socket. The front face of the female ferrule abuts the male component of the transceiver so as to position the fibers in the optical plane of the transceiver. In other cases, the male component 102 of the transceiver may be a standard male MT-RJ ferrule and the transceiver may have fibers extending into such ferrule so that such fibers constitute the input and output ports. These fibers are butt jointed to the fibers of a cable terminated by an MT-RJ connector when the connector is engaged in the socket.

The elements associated with the transceiver are designed to achieve maximum performance when used with mating fibers of a particular diameter. The term "nominal fiber diameter of a transceiver," as used in this disclosure, refers to the fiber diameter for which the transceiver is optimized. For example, transceivers arranged for multimode transmission of light commonly are optimized for use with glass fibers of 0.125 mm diameter. The ferrules of MT-RJ connectors typically have guide pins and fiber holes at locations matched with extreme precision, typically to tolerances of a few microns so that the fiber ends are aligned precisely with the optical ports of the transceiver, i.e., with the particular spots on the optical plane where the transceiver will applies or accepts light with maximum efficiency.

A loopback test device according to one embodiment of the invention, as shown in FIGS. 13–20 includes a housing 105 having an exterior configuration similar to the housing of a standard MT-RJ connector. Indeed, housing 105 may be identical to housings used in the standard MT-RJ connector of the '382 application or to the housings used in the other connectors discussed in the preceding sections of this application. A fiber 101 is connected to a female ferrule 104. Fiber 101 may be a plastic multimode fiber formed from a polymeric material, or a glass fiber. The fiber 101 is at least as large as the nominal fiber diameter of the transceiver. Preferably the fiber 101 is larger than the nominal fiber diameter of the transceiver. Where the transceiver is optimized for operation with typical multimode fibers of 0.125 mm diameter, fiber 101 has a diameter of 0.125 mm or more, and preferably greater than 0.125 mm typically between 0.125 mm and 0.5 mm. Stated another way, the diameter of the fiber in the loopback unit desirably is between about 1.0 times and 4 times the nominal fiber diameter of the mating transceiver.

Ferrule 104 desirably is an integrally molded plastic unit including a rear section 120 having a large interior bore 122 arranged to accommodate buffered fibers and having small, fiber-receiving bores 124 at its forward end. The ferrule also has guide pin receiving bores 126 molded at the forward end of the unit and opening to the forward face 125. The tolerances on the location and size of the fiber receiving bores and guide pin bores are larger than those typically allowed on conventional ferrules for use in standard connectors. In general, the larger the diameter of fiber 101 the larger the tolerances on the location and size of the fiber receiving bores. These relatively relaxed tolerances make it practical to mold the entire ferrule assembly 104 as a unit. The ferrule assembly may be molded from any dimensionally stable polymer, as, for example, a liquid crystal polymer or "LCP". Because the transceivers always incorporate male ferrules having guide pins, the ferrule 104 need not incorporate any provision for retaining guide pins permanently. Thus, the separate guide pin retainer typically used in a standard MT-RJ type connector may be omitted. The rear section 120 of the integral ferrule 104 has a spring seat 129 facing rearwardly, away from the front face 125.

Figure 15:
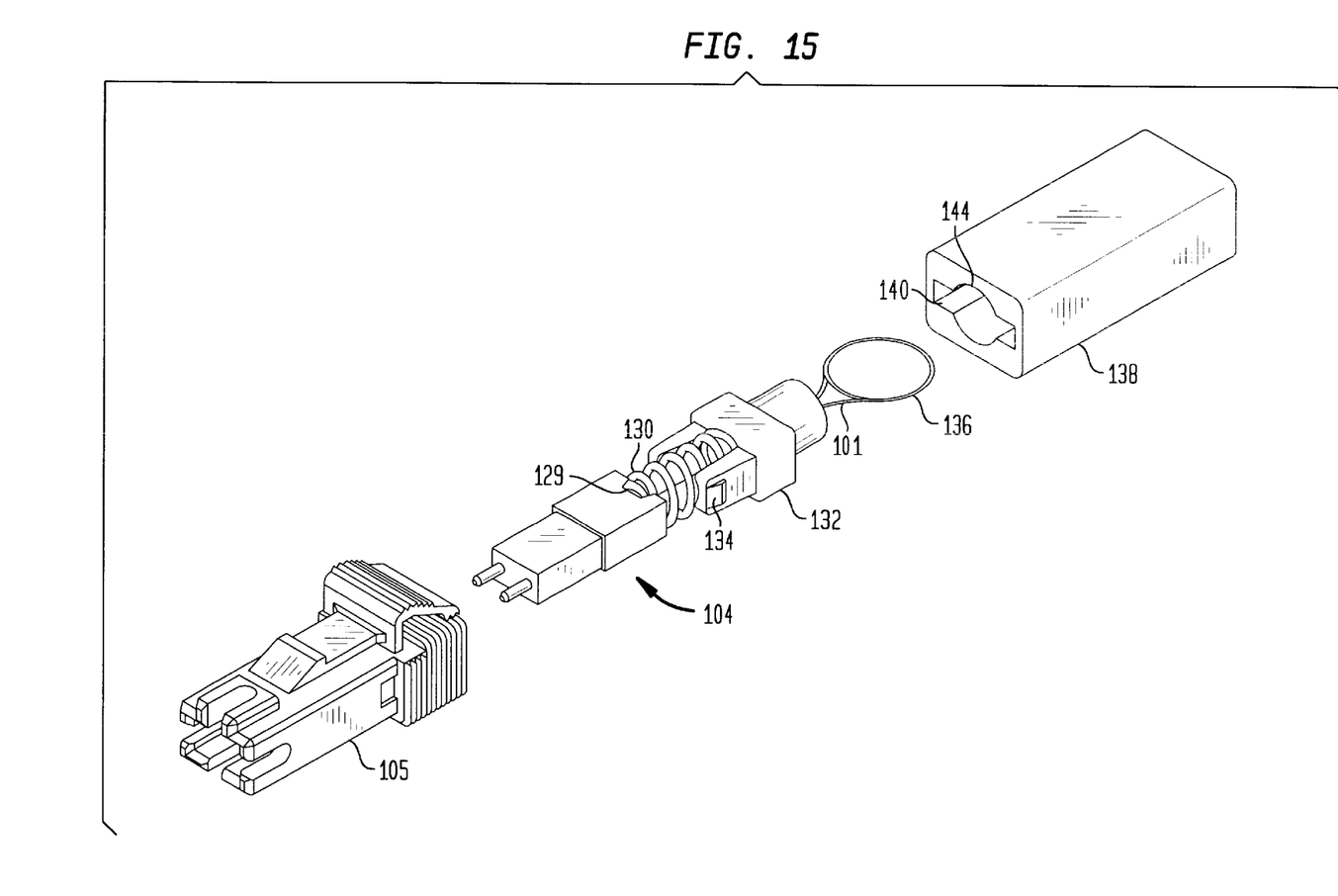
FIG. 15 is an exploded perspective view of the device of FIG. 13.
Figure 16:
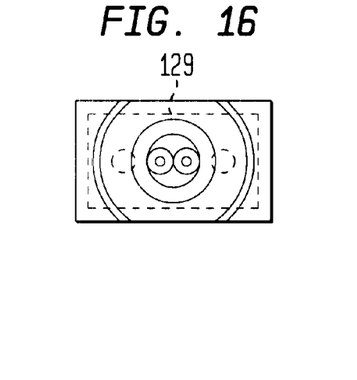
FIG. 16 is a rear elevational view of the ferrule of the device of FIG. 13.
Figure 17:
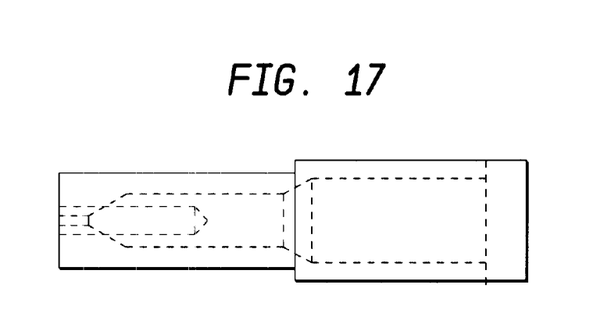
FIG. 17 is a side cross-sectional view of the ferrule of FIG. 13.
Figure 18:
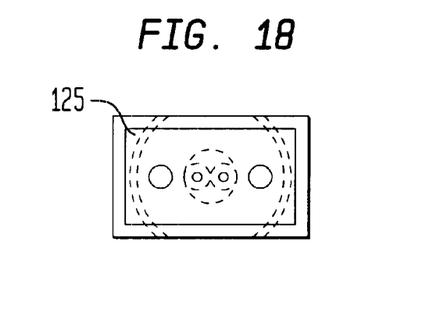
FIG. 18 is a front elevational view of the ferrule of the loopback testing device of FIG. 13.
Figure 19:
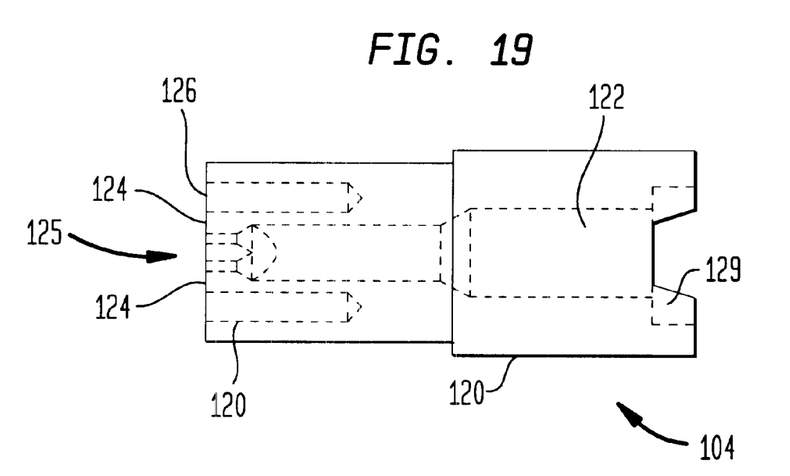
FIG. 19 is a top plan view of the ferrule of FIG. 13.
Figure 20:
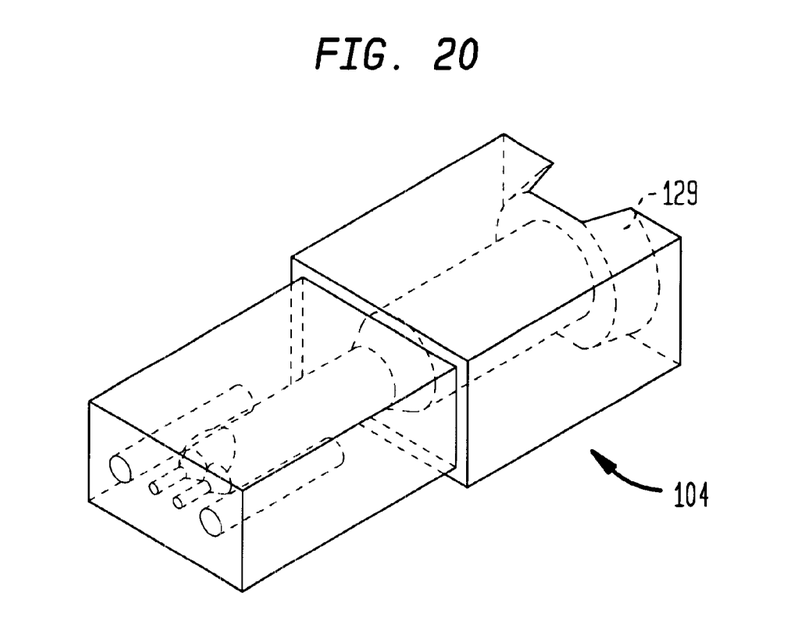
FIG. 20 is a perspective view of the ferrule of FIG. 13.

A coil spring 130, best seen in FIG. 15, is engaged with the spring seat 129. The coil spring is positioned around fiber 101. A crimp nut 132, which may be identical to the crimp nut used in a standard MTRJ connector as disclosed in the '382 application on the crimp nut 29 discussed above with reference to FIGS. 1–5 is engaged with the spring. Fiber 101 extends through the interior bore of crimp nut 132 and through the center of spring 130. Snaps 134 on the crimp nut, similar to the snaps 62 on the crimp nut discussed above with reference to FIGS. 1–5, hold the crimp nut in engagement with housing 105 so that spring 130 is in compression. Ferrule 104 is retained by internal ledges within the housing in the same manner as discussed in the '382 application. Thus, the front face 125 of the ferrule assembly projects slightly from housing 105, but can be forced rearwardly by the mating connector. Fiber 101 is bent so that both ends of the fiber extend generally parallel to one another and are received in the fiber receiving bores 124 of ferrule 104. Desirably, the fiber is formed into one or more loops 136 which are positioned to the rear of crimp nut 132. The number of loops 136 used in any given unit is determined by the desired degree of attenuation. At least that portion of fiber 101, which is bent, is unsheathed. That is, the fiber is not covered by the normal tubular sheath that immediately surrounds the fiber and which extends along the length of the fiber in a conventional fiber optic cable. The unsheathed fiber can be bent to a relatively small bend radius. For example, the fiber can be coiled into small-diameter loops. After bending, the fiber may be annealed to relieve stresses induced by bending. The length of fiber 101 and the number of loops or other bends in such fiber are selected to give the desired degree of attenuation. A relatively large diameter, plastic fiber gives a greater degree of attenuation per unit length than the conventional glass fiber used for actual communications.

Figure 13:
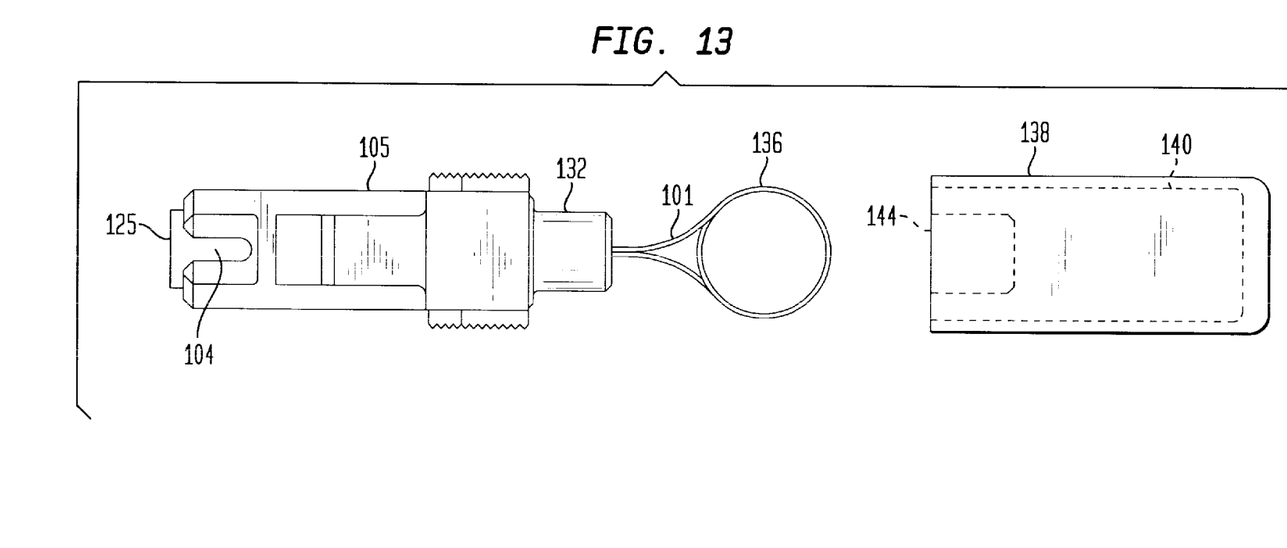
FIG. 13 is a partially exploded top plan view of the loopback testing device according to one embodiment of the present invention.
Figure 14:
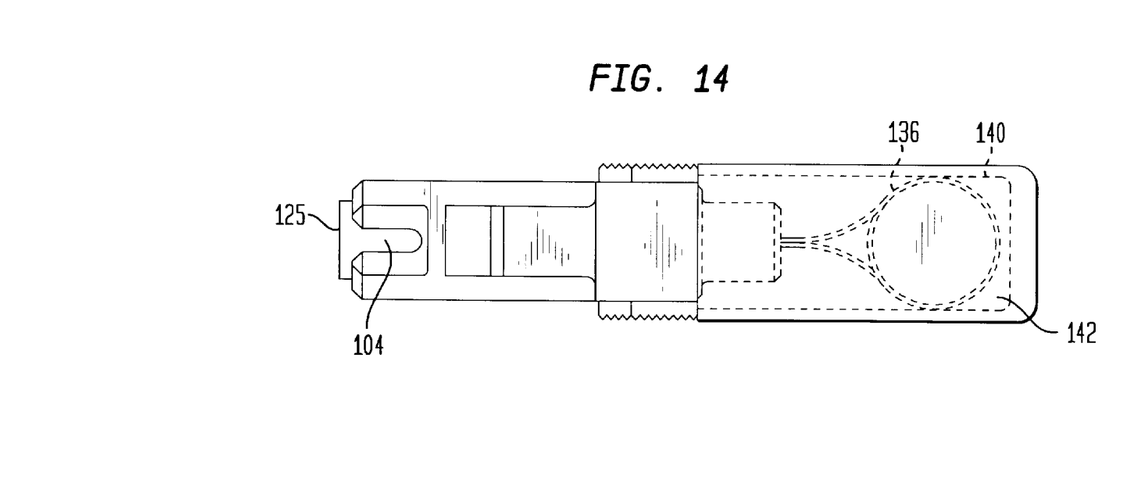
FIG. 14 is a top plan view of the device of FIG. 13 received in a boot.

A boot 138 is fastened to crimp nut 132. The loops or other bends of fiber 136 are accommodated within boot 138. The lateral and vertical dimensions of boot 138 desirably are equal to or only slightly greater than the lateral and vertical dimensions of housing 105, and equal to or only slightly greater than the dimensions of the mating socket 103. Thus, the entire assembled unit has lateral and vertical dimensions fitting within the space provided for each socket 103 on a device. For use with devices intended for connection to MT-RJ sockets, the loopback test unit according to this aspect of the invention desirably has lateral dimensions less than about 10.5-mm, more desirably about 9.4-mm or less and vertical dimensions less than about 11-mm, more desirably about 10.1-mm or less, so that loop back test units can be inserted into all sockets of a device, without interfering with one another even where the sockets are disposed close to one another.

A slot 140 within the boot 138 extends deep into the boot as best seen in FIGS. 13 and 14. Slot 140 accommodates loops 136. There is a small clearance 142 between the fiber loops 136 and the rear wall of slot 140. This allows the fibers to move rearwardly along with ferrule assembly 104 when the unit is plugged into a socket. Slot 140 desirably has a round opening 144 at its forward end which fits onto the round surface at the rear end of crimp nut 132. Boot 138 desirably is secured permanently to the crimp barrel, as for example, by solvent welding, sonic bonding or other conventional plastic bonding techniques. Because the crimp nut 132 is held in fixed position on housing 105, boot 138 is held in fixed position relative to the housing.

The loopback test units according to this aspect of the aspect of the invention desirably are so economical to produce so that the same can be provided as disposable items. For example, the manufacturer of the device 100 may ship the device with loopback test units installed in all of sockets 103 for initial testing and startup. This assures that the loop back test units for the particular device will have the correct attenuation for that device and also assures that the technician will be able to test the entire device rapidly when the device is first installed.

Loopback test units according to other variants of the invention may include features such as the fiber loops 136 and enclosing boot 138 in combination with a standard ferrule assembly. In other variants, boot 138 may be mounted to the ferrule 104 so that the boot moves with the ferrule relative to the housing. Also, the boot may be fabricated by molding a settable composition around fiber 101 after the fiber has been bent.

Moreover, although the foregoing discussion exemplifies the use of the various aspects of the invention in the MT-RJ format, the same principles can be applied to devices for use with other connector formats. For example, a loopback test device can be provided in a format suitable for use with a transceiver adapted to engage a duplex SC connector. In this case, the housing and related components would have a configuration corresponding to the configuration of a duplex SC connector. Further, although the foregoing discussion sets forth combinations of elements, the present invention further includes subcombinations and the individual elements themselves.

As these and other variations and combinations of the features set forth above may be used without departing from the present invention, the foregoing description should be taken by way of illustration rather than by way of limitation of the present invention.

What is claimed is:

1. A male MT-RJ connector having:
   (a) a housing insertable within an MT-RJ socket;
   (b) a ferrule mounted in said housing in fixed position so that the ferrule cannot be displaced relative to the housing during connection, said ferrule having a front face and having fiber bores extending to said front face; and
   (c) alignment pins projecting from said ferrule.

2. A connector as claimed in claim 1 further comprising a field termination unit having fiber bores therein, and pre-installed fiber segments extending from said field termination unit fiber bores and extending in the fiber bores of the ferrule to the front face of the ferrule.

3. A connector as claimed in claim 2 wherein said field termination unit is disposed in said housing immediately behind said ferrule, the connector further comprising a fitting retaining said field termination unit in said housing.

4. A connector as claimed in claim 3 wherein said fitting is a crimp nut having a rear portion defining a channel adapted to pass the fibers of a fiber optic cable, said rear end portion being adapted to fit within the jacket and reinforcement of the cable so that the cable can be secured to the crimp nut by a crimp ring encircling the jacket.

5. A connector as claimed in claim 1 further comprising a device disposed in said housing and engaging the rear surface of said ferrule to maintain said ferrule in position within said housing, said pins having heads projecting from the rear of said ferrule, said device engaging said pins to retain said pins against forward and rearward motion relative to said ferrule and housing.

6. A device for use in making a male MT-RJ connector said device having a body adapted to fit within the housing of a male MT-RJ connector, said body defining a forward wall adapted to engage the rear surface of a ferrule and a pair of pin head slots disposed rearwardly of said forward wall, said pin head slots being open to a top surface of the device so that a ferrule with pins therein can be advanced downwardly relative to the device to engage the heads of the pins in the pin head slots.

7. A device as claimed in claim 6 wherein said body defines a generally U-shaped fiber channel open to the top of the device at the rear of the device.

8. A method of making a male MT-RJ connector comprising the steps of:
(a) assembling the fibers of a fiber optic cable into fiber bores of a ferrule, securing the fibers to the ferrule and polishing the front face of the ferrule and the forward ends of the fibers;
(b) assembling pins into the ferrule so that heads on the pins project rearwardly from the ferrule, and so that the pins project forwardly from the front face of the ferrule;
(c) advancing the ferrule and fibers downwardly into a device so as to engage the heads of the pins in pin head grooves of the device, place the fibers into the device so that the fibers extend from the rear of the device and thereby form a subassembly; and
(d) placing the subassembly formed in step (c) into a housing so that the device is engaged in the housing and abuts the rear surface of the ferrule to hold the ferrule in position in the housing.

9. A method as claimed in claim 8 further comprising the step of securing the jacket of the cable, a reinforcement of the cable or both to the rear end of the device.

10. A method as claimed in claim 8 wherein said step of placing the subassembly includes advancing the subassembly forwardly to engage features of the device and housing and thereby lock the device to the housing.

11. A device as claimed in claim 7 wherein said body is adapted to lock to the housing of a male RJ connector when the device is disposed within the housing of the connector.

* * * * *